United States Patent [19]

Story et al.

[11] Patent Number: 4,624,269
[45] Date of Patent: Nov. 25, 1986

[54] CHEWABLE TOBACCO BASED PRODUCT

[75] Inventors: Larry D. Story; Luther B. Pittman, both of Owensboro, Ky.

[73] Assignee: The Pinkerton Tobacco Company, Owensboro, Ky.

[21] Appl. No.: 651,295

[22] Filed: Sep. 17, 1984

[51] Int. Cl.$^4$ .................. A24B 13/00; A24B 13/02
[52] U.S. Cl. ................................ 131/352; 131/347; 131/366
[58] Field of Search ............... 426/6, 4; 131/366, 352, 131/347

[56] References Cited

U.S. PATENT DOCUMENTS

| | | | |
|---|---|---|---|
| 214,639 | 4/1879 | Emery | 131/366 |
| 865,026 | 0/0000 | Ellis | 131/366 |
| 904,521 | 11/1908 | Ellis | 131/352 |
| 4,387,108 | 6/1983 | Koch et al. | 426/4 |
| 4,452,820 | 6/1984 | D'Amelia | 426/6 |

OTHER PUBLICATIONS

*Tobacco Dictionary*, p. 157 cited, published by Philosophical Library, N.Y., N.Y. (USA), edited by Raymond Jahn, date of publication Mar. 1955.

*Primary Examiner*—V. Millin
*Attorney, Agent, or Firm*—Kenyon & Kenyon

[57] ABSTRACT

The composition of matter is made up of tobacco in an amount of from 10 to 40% by weight and a masticatory in an amount of at least about 60% to 90% by weight of the composition. The composition is soft and easy to masticate and is able to impart a constant release of tobacco flavor over a period of time when masticated. The composition permits a controlled flavor release determined by the rapidness of mastication and by the size of the tobacco particle.

13 Claims, No Drawings

CHEWABLE TOBACCO BASED PRODUCT

This invention relates to a composition of matter and particularly to a masticatory tobacco product.

Heretofore, there have been two main types of smokeless tobacco products in the marketplace, i.e. snuff and chewing tobacco.

Generally, snuff is produced in two forms, namely, as a finely ground dry snuff which is usually of a powdery nature and a moist coarse to fine cut snuff which tends to be made of larger particles.

Chewing tobaccos are made in a "plug" wherein the tobacco is compressed into various shapes for marketing purposes, or "loose leaf" wherein the tobacco is not compressed. Some chewing tobaccos are prepared by dipping the tobacco in a casing solution for the purpose of imparting the desired flavors. Subsequently, the cased tobacco is partially dried and packaged.

Over the years, various refinements have been made in the manufacture of tobacco products intended for the so-called smokeless tobacco market. For example, U.S. Pat. No. 1,376,586 describes the shaping of tobacco into tablets and the coating of the tablets with a cohesive gummy substance, such as chicle. The gummy substance is intended to preserve the juices of the tobacco and to prevent evaporation of the juices. In use, such a product is intended to improve the mildness perception when the tobacco is first taken into the mouth while also preventing excessive flow of the tobacco juices.

In the more recent past, it has been known, for example, from U.S. Pat. No. 3,166,078 to make a masticable tobacco product by mixing finely divided tobacco with a thermoplastic resin to form a sheet, ribbon or the like which can be subsequently formed into cakes or plugs, sheets, or sticks. In this case, ground tobacco of at least 60% by weight of the mixture is mixed with a water-insoluble resin, preferrably with a suitable plasticizer for the resin, of not more than 40% by weight of the mixture.

It has also been known from U.S. Pat. No. 3,877,468 to make a masticable tobacco substitute composition which is comprised of a gum base of at least about 40% by weight of the composition and an alkaloid, such as nicotine, in an amount of about 0.05% by weight to about 2% by weight based on the weight of the gum base. In this case, the amount of the alkaloid is intended to be effective in providing satisfaction similar to cigarette smoking.

It has also been known that various types of reconstituted tobacco compositions can be made of tobacco and gums, such as described in U.S. Pat. No. 3,821,959, for use in making sheets which can be used in cigar wrappers. However, such sheets have not been used as an end product for use by a consumer.

In general, snuff and chewing tobaccos per se have several disadvantages to the user. First, the normal usage of chewing tobacco results in excess expectoration. Further, the aesthetics of disposing of the quid creates a problem. Furthermore, tobacco particles tend to disperse or "float" in the oral cavity, causing total removal to be difficult. In those cases where it has been suggested to coat a tobacco tablet with a gum as in U.S. Pat. No. 1,376,586, a relatively large amount of tobacco is required. Further, chewing of such a product would require the user to blend together the gum and tobacco without any particular control of the flavor release of the tobacco and with the flavor impact being reduced due to the continued blending of the initially unblended tobacco into the gum.

Accordingly, it is an object of the invention to provide a composition of matter which permits a controlled flavor release of tobacco.

It is another object of this invention to provide a composition of matter which will eliminate excess expectoration.

It is another object of the invention to provide a composition of matter which can be masticated without creating a disposal problem.

It is another object of the invention to provide a composition of matter which is soft and easy to chew while imparting a tobacco taste.

It is another object of the invention to provide a bound homogeneous tobacco composition, the particles being prevented from dispersing or "floating" in the oral cavity upon mastication.

Briefly, the invention provides a composition of matter which is comprised of chewing tobacco in an amount of from 10% to 40% by weight of the composition and a masticatory in an amount of at least about 60% to 90% by weight of the composition.

The composition is characterized in being deformable, soft, and easy to chew. In this respect, the tobacco is provided in an amount sufficient to provide the flavor of tobacco over the period of time in which the composition would be masticated by a user. Further, the masticatory is in an amount sufficient to permit easy chewing of the composition while controlling the flavor release of the tobacco. In this latter respect, the flavor release is controlled, in use, by the composition of the masticatory regulating the contact of the saliva with the tobacco particles. Further, the flavor release is controlled, in use, by the degree of chewing. That is, the more rapid the chew, the more flavor is released. Further, the flavor release is controlled, in general, by the particle size of the tobacco; that is, the larger the particle size of the tobacco, the slower the release. For example, the size of the tobacco may range from 4–400 mesh with a preferred range of 16–40 mesh.

It has been found that chewing of certain compositions creates a swelling of the composition, which is primarily due to the saliva swelling the masticatory. For example, the masticatory may include paraffin waxes, microcrystalline waxes and/or polymeric rubbers.

The composition can be made in any suitable manner in which the tobacco and masticatory can be homogeneously mixed together. Also, the composition can be formed into various shapes and sizes to permit oral mastication.

One process for making the composition includes the steps of mixing and melting a wax based masticatory and a butyl rubber. Thereafter, the material can be extruded or poured into a mass of tobacco of suitable size so as to be mixed together into a homogeneous batch which can thereafter be formed into suitable sizes and shapes. Also, the masticatory can be mixed directly with the tobacco particles and thereafter extruded into suitable shapes and sizes.

These and other objects and advantages of the invention will become more apparent from the following examples of compositions of matter which have been produced.

In one embodiment, the composition of matter was comprised of tobacco in an amount of 15.5% by weight of the composition, a masticatory in an amount of 75.2% by weight of the composition with the masticatory including a mixture of butyl rubber and microcrystalline wax, a flavoring and a sweetener. Of the masticatory moiety, the butyl rubber constituted 18% of the mixture while the wax constituted 82% of the mixture. Lastly, the wintergreen flavoring constituted 9% by weight of the composition while the sweetener constituted 0.3% by weight of the composition.

In a variation of the above embodiment, the tobacco included equal portions of fine ground tobacco and coarse ground tobacco. The flavoring was a sprayed dried powdered wintergreen flavoring.

Other examples of the composition included the following:

EXAMPLE 1

| Rosin Ester | 22.1% |
| --- | --- |
| Hydrogenated Wood Rosin Ester | 22.1 |
| Glycerol Monostearate | 7.3 |
| Butyl Rubber | 0.3 |
| Microcrystalline Wax | 14.4 |
| Hydrocarbon Resin | 7.3 |
| Cane Sugar | 10.0 |
| Tobacco | 15.5 |
| Tobacco Extract | 1.0 |
| | 100.0% |

The rosin ester was melted and stirred in a container heated to a temperature of 110° C. Thereafter, the ester of the hydrogenated wood rosin was added to the melt and dissolved, followed by the glycerol monostearate which was also melted and dissolved. Thereafter, a concentrate of 2/98 butyl rubber/microcrystalline wax in an amount of 14.7% was added to the melt and dissolved. Next, the hydrocarbon resin was added followed by the cane sugar, tobacco of a size of 16–20 mesh and the flavor.

EXAMPLE 2

| Butyl Rubber | 4% |
| --- | --- |
| Polyvinylacetate | 8 |
| Styrene/Butadiene Polymer | 4 |
| Rosin Ester | 22 |
| Wax | 6 |
| CaCO$_3$ | 11 |
| Paraffin Wax | 5 |
| Tobacco | 40 |
| | 100% |

In this case, the butyl rubber, Polyvinylacetate, styrene/butadiene polymer, rosin ester, wax, and calcium carbonate were melted and stirred in a container. Thereafter the paraffin wax was added to the melt and, subsequently, the the tobacco was added in a size of 16–20 mesh.

EXAMPLE 3

| Paraffin Wax | 44% |
| --- | --- |
| Microcrystalline Wax | 29 |
| Butyl Rubber | 13 |
| Tobacco | 13 |
| Saccharin | 1 |
| | 100% |

In this case, the 30/70 butyl rubber/microcrystalline wax concentrate in an amount of 42% of the total composition was melted and stirred in a heated container at a temperature of 90° C. Thereafter, the paraffin wax was added and allowed to melt and dissolve into a uniform melt. Next, tobacco of a size of 16–20 mesh was added followed by the addition of the saccharin. When thoroughly mixed, the mixture was poured into a mold and cooled.

EXAMPLE 4

| Microcrystalline Wax | 41.0% |
| --- | --- |
| Butyl Rubber | 17.6 |
| Lecithin | 1.2 |
| Tobacco | 40.0 |
| Saccharin | 0.1 |
| Brown Lake Dye | 0.1 |
| | 100.0% |

A 30/70 butyl rubber/microcrystalline wax concentrate in an amount of 58.6% was melted and stirred in a heated container. Thereafter, the lecithin was added and uniformly dispersed. Next, tobacco of a size of 16–20 mesh was added followed by the saccharin and the Brown Lake dye.

EXAMPLE 5

| Paraffin Wax | 30.0% |
| --- | --- |
| Microcrystalline Wax | 31.6 |
| Butyl Rubber | 13.6 |
| Tobacco | 15.5 |
| Wintergreen | 9.0 |
| Saccharin | 0.3 |
| | 100.0% |

In this case, a 30/70 butyl rubber/microcrystalline wax concentrate in an amount of 45.2% was melted and stirred in a heated container. Thereafter, the paraffin wax was added and allowed to melt and dissolve into a uniform melt. Next, tobacco of a size of 16–20 mesh was added followed by the flavor and saccharin. When thoroughly mixed, the resultant mixture was poured into a mold and cooled.

EXAMPLE 6

| 30/70 Butyl Rubber/Microcrystalline Wax Concentrate | 18.5% |
| --- | --- |
| Glycerol Ester of Hydrogenated Wood Rosin | 43.1 |
| Glycerol Monostearate | 6.2 |
| Paraffin Wax | 6.2 |
| 16–20 Mesh Tobacco | 12.3 |
| 32–40 Mesh Tobacco | 12.3 |
| Saccharin | 0.7 |
| Ammoniated Glycyrrhizin | 0.7 |
| | 100.0% |

In this case, the rubber/wax concentrate was heated and stirred in a vessel of 90° C. Thereafter, the remaining ingredients were individually added in the order listed above.

Further, each ingredient was allowed to melt and/or thoroughly mix before the addition of the next ingredient. After being thoroughly mixed, the resultant formulation was poured into a mold and cooled. Of note, the use of butyl rubber provides a good binder for holding the tobacco within the composition while permitting a controlled release of the tobacco flavor.

The use of the wax and rosin ester permits the composition to be chewed since the butyl rubber alone is not masticable. The amounts of butyl rubber, wax, rosin ester and tobacco may vary depending upon the degree of masticability and tobacco flavor release required of the composition. For example, the butyl rubber may be in the range of from 1 to 50 percent by weight of the composition; the wax may be in an amount of from 10 to 90 percent by weight of the composition; the rosin ester may be in the range of from 0 to 50 percent by by weight of the composition, and the tobacco may be in the range of 10 to 40 percent by weight of the composition.

The invention provides a composition such that it can be masticated without falling apart. Further, the composition eliminates excess expectoration during mastication. Further, when mastication is completed, the composition can be disposed of in a relatively simple, relatively neat manner. Still further, the composition is capable of imparting a tobacco flavor and taste when masticated with the flavor release of the tobacco being controlled by the rapidness of chewing.

The invention further provides a composition which utilizes a relatively small amount of tobacco in order to achieve a relatively good tobacco flavor release. Further, the flavor of the tobacco can be uniformly released during mastication, at least, for about 30 minutes.

What is claimed is:

1. A composition of matter comprising in combination
   tobacco in an amount of 15.5% by weight of the composition;
   a masticatory in an amount of 75.2% by weight of the composition and including a mixture of butyl rubber and microcrystalline wax;
   a flavoring; and
   a sweetener.

2. A composition of matter as set forth in claim 1 wherein said butyl rubber constitutes 30% of said mixture and said wax constitutes 70% of said mixture.

3. A composition of matter as set forth in claim 1 wherein said flavoring constitutes 9% by weight of the composition and said sweetener constitutes 0.3% by weight of the composition.

4. A composition of matter comprising in combination

| | |
|---|---|
| Rosin Ester | 22.1% |
| Hydrogenated Wood Rosin Ester | 22.1 |
| Glycerol Monostearate | 7.3 |
| Butyl Rubber | 0.3 |
| Microcrystalline Wax | 14.4 |
| Hydrocarbon Resin | 7.3 |
| Cane Sugar | 10.0 |
| Tobacco | 15.5 |
| Tobacco Extract | 1.0 |
| | 100.0% |

5. A composition of matter comprising in combination
   a masticatory in an amount of 55% by weight of the composition and including

| | |
|---|---|
| Butyl Rubber | 4.0% |
| Polyvinylacetate | 8.0% |
| Styrene/Butadiene | 4.0% |
| Rosin Ester | 22.0% |
| Wax | 6.0% |
| CaCO$_3$ | 11.0%; | paraffin wax in an amount of 5% by weight of the composition; and
tobacco in an amount of 40% by weight of the composition.

6. A composition of matter comprising in combination by weight percent

| | |
|---|---|
| Paraffin Wax | 44.0% |
| Microcrystalline Wax | 29.0 |
| Butyl Rubber | 13.0 |
| Tobacco | 13.0 |
| Saccharin | 1.0 |
| | 100.0% |

7. A composition of matter comprising in combination by weight percent

| | |
|---|---|
| Microcrystalline Wax | 41.0% |
| Butyl Rubber | 17.6 |
| Lecithin | 1.2 |
| Tobacco | 40.0 |
| Saccharin | 0.1 |
| Brown Lake | 0.1 |
| | 100.0% |

8. A composition of matter comprising in combination by weight percent

| | |
|---|---|
| Paraffin Wax | 30.0% |
| Microcrystalline Wax | 31.6 |
| Butyl Rubber | 13.6 |
| Tobacco | 15.5 |
| Flavor | 9.0 |
| Saccharin | 0.3 |
| | 100.0% |

9. A composition of matter comprising
   chewing tobacco in an amount of at least 15.5% by weight of the composition; and
   a masticatory in an amount of at least about 60% by weight of the composition, said masticatory including a butyl rubber and wax mixture, said butyl rubber being sufficient to hold said tobacco within the composition while permitting a controlled release of tobacco flavor on mastication.

10. A composition of matter as set forth in claim 9 wherein said masticatory includes paraffin wax.

11. A composition of matter as set forth in claim 9 wherein said masticatory includes microcrystalline wax.

12. A composition of matter as set forth in claim 9 wherein masticatory includes butyl rubber in an amount of up to 50 percent of said compositon.

13. A composition of matter as set forth in claim 9 wherein masticatory includes a wood rosin ester.

* * * * *